United States Patent
Sato et al.

(10) Patent No.: US 7,017,545 B2
(45) Date of Patent: Mar. 28, 2006

(54) BALANCER DEVICE OF ENGINE

(75) Inventors: Masaaki Sato, Hiroshima (JP); Satoshi Imamura, Hiroshima (JP); Sakumi Haseto, Hiroshima (JP); Kazuo Isayama, Hiroshima (JP); Nobuhiko Tanaka, Hiroshima (JP); Akihiro Noda, Hiroshima (JP); Ichiro Hirose, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/934,369

(22) Filed: Sep. 7, 2004

(65) Prior Publication Data

US 2005/0061284 A1 Mar. 24, 2005

(30) Foreign Application Priority Data

Sep. 19, 2003 (JP) .............................. 2003-327641
Sep. 19, 2003 (JP) .............................. 2003-327656

(51) Int. Cl.
*F02B 75/06* (2006.01)
(52) U.S. Cl. ................. 123/192.2; 123/195 R
(58) Field of Classification Search ............. 123/192.2, 123/195 R
See application file for complete search history.

(56) References Cited

U.S. PATENT DOCUMENTS 6,471,008 B1   10/2002   Iwata

FOREIGN PATENT DOCUMENTS

| EP | 1 081 345 A1 | 3/2001 |
| EP | 1 155 770 A2 | 11/2001 |
| EP | 1 279 858 A1 | 1/2003 |
| EP | 1 304 450 A2 | 4/2003 |

*Primary Examiner*—Noah P. Kamen
(74) *Attorney, Agent, or Firm*—Nixon Peabody LLP; Donald R. Studebaker

(57) ABSTRACT

A first balancer shaft includes a shaft extension portion extending forward, to which a driven sprocket is attached. A case member includes a first bearing portion supporting the balancer shaft near its weight portions and rotational gear and a second bearing portion supporting the same near its driven sprocket. The case member includes an upper case coupled to a cylinder block and a lower case facing to the upper case, and there is provided a case extension portion extending forward at the upper case. The first bearing portion is configured of a hole formed by half-split portions of the both cases and the second bearing portion is configured of a hole formed integrally at the case extension portion.

10 Claims, 9 Drawing Sheets

BALANCER DEVICE OF ENGINE

BACKGROUND OF THE INVENTION

The present invention relates to a balancer device of an engine and belongs to a technical filed of measures against engine vibration and noise.

Generally, the balancer device equipped at an engine for a motor vehicle and the like for suppressing vibration and noise thereof has a structure in which a pair of balancer shafts having weight portions are disposed in parallel to a crankshaft so as to be supported rotatably at a case member which is provided at a lower portion of an engine block (an assembly of engine parts, such as, for example, a cylinder block, a lower block, a bearing cap, a bearing frame) supporting a crankshaft rotatably. Also, there are provided an endless chain winding around a driving sprocket attached to one end of the crankshaft (for example, to a front end of the engine) and a driven sprocket attached to one end of either of the balancer shafts (first balancer shaft), and a pair rotational gears provided on the both balancer shafts so as to engage with each other, whereby the balancer shafts are rotated respectively in opposite directions by the crankshaft. The rotation of the balancer shafts with such weight portions generate a vibrating force in a vertical direction, which can cancel a vibrating force in the vertical direction which is caused by the combustion occurring in respective engine cylinders, thereby suppressing the engine vibration and noise.

Japanese Patent Laid-Open Publication No. 2001-74104 (FIGS. 2 and 3) (its corresponding U.S. Pat. No. 6,471,008 and EP Patent Publication No. 1081344) discloses a structure in which a pair of weight, portions are provided on respective balancer shafts in the axial direction, the rotational gears are provided in front of front-side weight portions, and rear-side journal portions formed between the weight portions and front-side journal portions formed in front of the rotational gears are supported respectively at front-and-rear bearing portions at the case member, whereby the balancer shafts are supported rotatably at the case member.

Particularly, in the structure disclosed in the above-described publication, the case member is comprised of an upper case and a lower case which are provided facing each other, each of the rear-side bearings is formed in a hole shape by respective half-split portions of the upper and lower cases, and each of the front-side bearing portions is formed in a hole shape by a hole which has been formed integrally at either one of the upper and lower cases.

Herein, when the balancer shafts are assembled in the case member, before attaching the upper and lower cases to each other, each of one end of the balancer shafts is inserted into the hole of the front-side bearing portions to locate the front-side journal portions at the front-side bearings portions, and then the rear-side journal portions are positioned on the half-split portions of the rear-side bearing portions. Then, the upper and lower cases are attached to each other so as to form the rear-side bearing portions in the hole shape, whereby the rear-side journal portions are supported at the rear-side bearing portions.

Meanwhile, in order to attain surely a suppression effect of engine vibration and noise by the balancer shaft, the weight portions of the balancer shaft are located at a central portion in the axial direction of engine (for example, in the case of an inline 4-cylinder engine, at portions corresponding to a second and third cylinders thereof). On the other hand, in order to provide a proper and sure endless chain winding, the driven sprocket of the first balancer shaft is located so as to align with the driving sprocket of the crankshaft, so that the driven sprocket is provided at the one end of the engine in the axial direction (for example, to the front end of the engine). Accordingly, the first balancer shaft with the driven sprocket is configured so as to extend beyond the second balancer shaft without the driven sprocket at the above-described one-end side thereof, and the driven sprocket is attached to the shaft extension portion. Also, a tension by the endless chain is applied to the driven sprocket. Accordingly, if the first balancer shaft is not supported rotatably near the driven sprocket, the above-described shaft extension portion of the first balancer shaft is apt to bend and thereby causes vibration of the driven sprocket. As a result, there occurs a problem that vibration and noise may be caused by the balancer device itself.

SUMMARY OF THE INVENTION

The present invention has been devised in view of the above-described problem of an balancer device of an engine including a pair of balancer shafts and a driven sprocket attached to either one of the balancer shafts, and an object of the present invention is to provide a balancer device of an engine that can support the balancer near the driven sprocket firmly and rotatably.

Namely, according to the present invention of claim 1, there is provided a balancer device of an engine, including first and second balancer shafts having respective weight portions thereof, a case member provided at a lower portion of an engine block supporting a crankshaft and supporting the balancer shafts, and a driving member winding around a driving rotator attached to one end of the crankshaft and a driven rotator attached to one end of the first balancer shaft so as to rotate the first balancer shaft by the crankshaft, the improvement comprising a pair of rotational gears provided on the first and second balancer shafts so as to engage with each other, the rotational gears being located at the one end side of respective balancer shafts with respect with the weight portions of respective balancer shafts, a shaft extension portion provided integrally at the one end of the first balancer shaft so as to extend beyond the second balancer shaft, the shaft extension portion having the driven rotator attached thereto, a first bearing portion provided at the case member to support the balancer shafts at respective portions thereof near the weight portions and the rotational gears, a second bearing portion provided at the case member to support the first balancer shaft at a portion thereof near the driven rotator, upper and lower cases configuring the case member, the upper case being coupled to the engine block, the lower case being faced to the upper case, a case extension portion provided integrally at either the upper case or lower case so as to extend along the shaft extension portion of the first balancer shaft, wherein the first bearing portion is configured of a hole which is formed by respective half-split portions of the upper and lower cases, and the second bearing portion is configured of a hole which is formed integrally at the case extension portion.

Accordingly, since the first balancer shaft with the driven rotator attached thereto is supported rotatably at the portion thereof near the driven rotator at the second bearing portion provided at the case extension portion of the case member, the problem that vibration and noise may be caused by the balancer device itself because the shaft extension portion of the first balancer shaft bends and thereby causes vibration of the driven rotator can be avoided.

Further, since the second bearing portion is configured of the hole formed integrally at the case extension portion, the supporting rigidity of the second bearing portion increases and thus the shaft extension portion of the first balancer shaft is supported more firmly, thereby avoiding the above-described problem certainly. Otherwise, if the second bearing portion is configured of the half-split structure by the upper and lower cases like the first bearing portion, the tension of the endless chain may deteriorate a firm connection of the both cases and thus the supporting rigidity thereof may decrease, resulting in an uncertain avoidance of the above-described problem.

Meanwhile, since the first bearing portion is configured of the half-split structure by the upper and lower cases, the inserting distance of the balancer shaft into the second bearing portion can be shortened, thereby providing a compact case member. Otherwise, if the first bearing portion is configured of the hole formed integrally at the case member like the second bearing portion, the inserting distance of the one end of the balancer shaft into the second bearing portion may become longer and thus the case member may need a longer length in the axial direction, thereby deteriorating a compactness of the case member.

Particularly, since there are provided the large-diameter rotational gears at the portions of the balancer shafts which are located at the one-end sides thereof from the weight portions, such inserting of the balancer shafts need a large enough space (gear non-interference space) at the case member not to prevent the rotational gear from getting through. Accordingly, the longer the balancer shafts are, the bigger above-described gear non-interference space, which may constitute an useless space after engine assembling, is formed at the lower portion of the cylinder block, thereby deteriorating a layout utility.

Next, according to the present invention of claim 2, the case extension portion and the second bearing portion are provided integrally at the upper case.

Accordingly, since the case extension portion and the second bearing portion are provided at the upper case coupled directly to the engine block, the supporting rigidity of the second bearing portion can be increased further and the support of the axial extension portion of the first balancer shaft can be made more stable.

Next, according to the present invention of claim 3, the rotational gears are configured of helical gears, and a projecting portion operative to sustain a thrust force which acts on the balance shafts due to a rotation of the helical gears is formed at only either the upper case or the lower case at which the case extension portion and the second bearing portion are not provided.

Accordingly, a simple structure for sustaining the thrust force due to the rotation of the helical gears constituting the rotational gears can be provided, thereby improving a weight reduction of the case member.

Next, according to the present invention of claim 4, the case member is configured in a sealed structure so as to enclose the weight portions of the balancer shafts, and a lubricating oil passage to supply a lubricating oil respectively to the first and second bearing portions provided at the case member is formed in a wall portion constituting the case member.

Accordingly, since the case member is configured in the sealed structure so as to enclose the weight portions of the balancer shafts, a cavitation problem i.e., the weight portions of the balancer shafts stir an oil in an oil pan during their rotation and cause babbles, so that the (air) babbles are inducted from an oil strainer into the oil passage, can be avoided. Also, any unnecessary oil can be prevented from coming into the case member from outside. Furthermore, the lubrication for the first bearing portion supporting the balancer shafts at respective portions thereof near the weight portions and the rotational gears and the second bearing portion supporting the first balancer shaft at the portion thereof near the driven rotator can be performed stably and certainly.

Next, according to the present invention of claim 5, a supporting bracket is attached to a side face of the engine block which is located at a side of the one end of the crankshaft, there is provided at the supporting bracket a penetrating member penetrating the supporting bracket so as to be movable in an axial direction of the balancer shaft, and an end portion of the case extension portion is fixed to the penetrating member, whereby the case extension portion is supported at the supporting bracket.

Accordingly, since the supporting bracket is attached to the side face of the engine block located at the side of the one end of the crankshaft, there is provided at the supporting bracket the penetrating member penetrating the supporting bracket so as to be movable in the axial direction of the balancer shaft, and the end portion of the case extension portion is fixed to the penetrating member, whereby the case extension portion is supported at the supporting bracket, even if there occurs a positional gap between an attaching portion at the side of the supporting bracket and an attaching portion (the end portion) at the side of the case extension portion, the positional gap can be absorbed by the penetrating member operative to be movable in the axial direction with respect to the supporting bracket. Thus, any improper bend and strain may not occur at the supporting bracket and the case extension portion, so that the endless chain can be provided so as to wind properly and securely, without any changing of a distance between an axis of the driving rotator (sprocket) and an axis of the driven rotator (sprocket) and any inclining of the driven rotator (sprocket) with respect to the drive rotator (sprocket).

Namely, while improving the supporting rigidity of the first balancer shaft at the portion near the driven rotator by the second bearing portion provided at the case extension portion, the above-described structure can suppress an attaching displacement gap between the attaching portion at the side face of the engine block, i.e., at the side of the supporting bracket and the attaching portion (the end portion) at the side of the case extension portion of the case member which may occur due to an unavoidable positional changing in the axial direction. As a result, a stable support of the first balancer shaft can be attained.

Next, according to the present invention of claim 6, the engine block includes a cylinder block supporting an upper half of the crankshaft and a bearing cap attached to a lower portion of the cylinder block to support a lower half of said crankshaft, the case member is attached to a lower portion of the cylinder block, and the supporting bracket is attached to a side face of the bearing cap.

Accordingly, since the case member and the supporting bracket, which are connected with each other, are attached respectively the cylinder block and the bearing cap which are different members and therefore a likelihood of occurrence of the positional gap between the attaching portion at the side of the supporting bracket and the attaching portion (the end portion) at the side of the case extension portion may increase, the absorption of such positional gap by the penetrating member adaptive to be movable in the axial direction with respect to the supporting bracket can perform its function and effect more greatly.

Next, according to the present invention of claim 7, the supporting bracket includes a guide portion for the driving member winding around the driving and driven rotators.

Accordingly, since the supporting bracket has both the attaching function of the case extension portion to the engine block and the guiding function for the driving member winding around the rotators, reduction in numbers and costs of parts of the balancer device and the attaching work efficiency of the supporting bracket can be improved.

Next, according to the present invention of claim 8, the supporting bracket is made of a metal plate.

Accordingly, since the supporting bracket is made of the metal plate, a weight reduction of the engine can be improved.

According to the present invention of claim 9, a structure comprising the above-described claims 1, 2 and 3 is provided, and thereby substantially the same functions and effects as those can be obtained.

According to the present invention of claim 10, a structure comprising the above-described claims 1, 5, 6 and 8 is provided, and thereby substantially the same functions and effects as those can be obtained.

Other problems, functions, effects and the like become apparent from the following descriptions of the present invention.

DETAILED DESCRIPTION OF THE INVENTION

Figure 1:
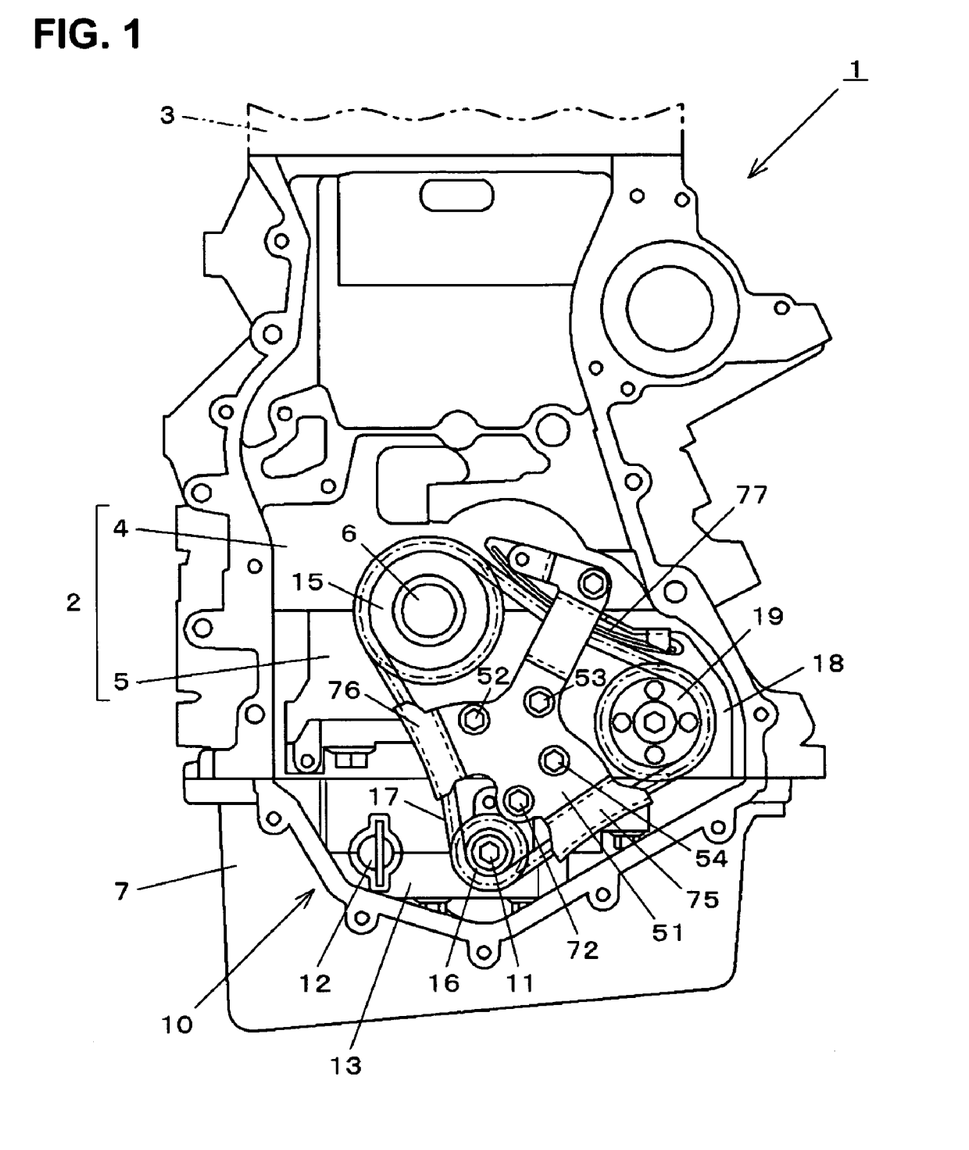
FIG. 1 is a view of an engine body without a chain cover according to a preferred embodiment of the present invention, when seen from a front side thereof.

Hereinafter, a preferred embodiment of the present invention will be described with reference to the accompanying drawings.

in the present embodiment, the present invention is applied to an engine 1 shown in FIG. 1. The engine 1 is an inline four-cylinder reciprocating engine. FIG. 1 shows the engine 1, when seen from its front side (a side of a chain cover, but herein not illustrated). An engine block 2 constituting a main body of the engine 1 includes a cylinder block 4 to which a cylinder head 3 is attached and a bearing frame 5 which is attached to a lower portion of the cylinder block 4. The bearing frame 5 is formed in a single piece which integrates plural bearing caps, and supports a crankshaft 6 rotatably in cooperation with the cylinder block 4. Herein, the cylinder block 4 supports an upper half of the crankshaft 6, while the bearing frame 5 supports a lower half of the crankshaft 6. An oil pan 7 for reserving a lubrication oil is attached to a bottom face of the cylinder block 4.

A balancer device 10 of the engine 1 comprises a case member 13 supporting rotatably a pair of right-and-left balancer shafts 11, 12. The case member 13 is attached to the lower portion of the cylinder block 4, like the above-described bearing frame 5, and the oil pan 7. Particularly, the case member 13 is attached to the bottom face of the cylinder block 4 like the oil pan 7.

Figure 2:
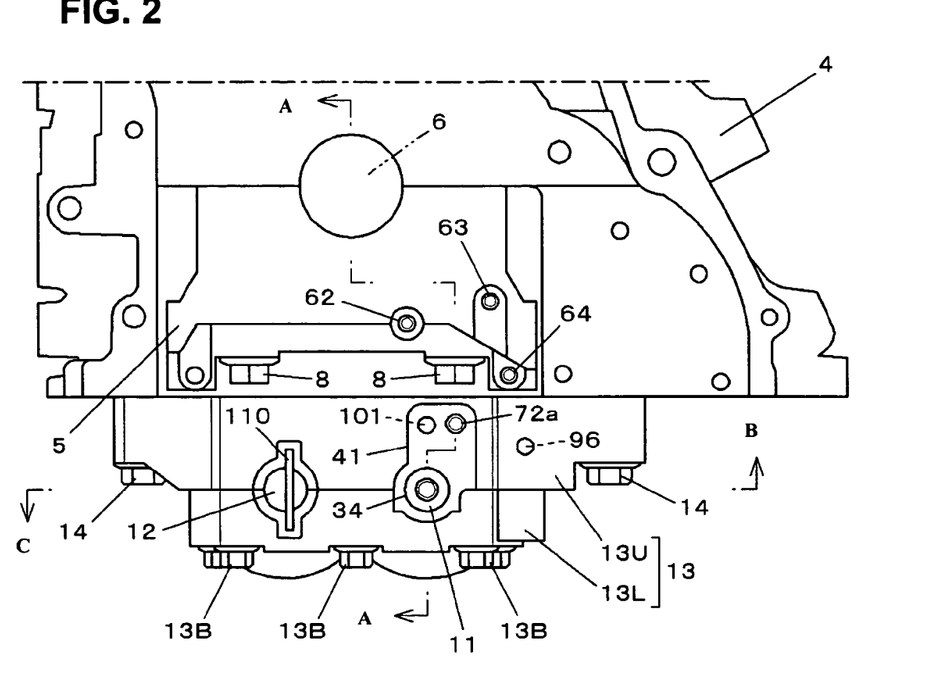
FIG. 2 is a partial enlarged view of the engine body, at a lower portion of which a bearing frame and a case member of a balancer device are provided, when seen from the front side thereof (without a crankshaft, sprockets, an endless chain, a supporting bracket, an oil pump and so on).

Next, FIG. 2 is a partial enlarged view showing a state where the bearing frame 5 and the case member 13 of the balancer device 10 are provided respectively at the lower portion of the cylinder block 4, when seen from the front side thereof (without the crankshaft 6, and sprockets 15, 16, 19, an endless chain 17, a supporting bracket 51, an oil pump 18 and so on which will be described below). As shown in FIG. 2, the case member 13 includes an upper case 13U which is coupled and fixed to the cylinder block 4 directly and a lower case 13L which is faced to the upper case 13U from below. These cases 13U, 13L are made of aluminum alloy and are connected by plural bolts 13B . . . 13B. The case member 13 is provided in the oil pan 7, striding over the bearing frame 5.

The bearing frame 5 is fixed to the lower portion of the cylinder block 4 by plural bolts 8 . . . 8 which are located in line at right-and-left sides of the crankshaft 6 in an axial direction. Also, the case member 13 is fixed to the bottom face of the cylinder block 4 by plural bolts 14 . . . 14 which are located at right-and-left sides of the bearing frame 5.

Returning to FIG. 1, the driving sprocket 15 is attached to a front end of the crankshaft 6 (front end of the engine body), the driven sprocket 16 is attached to a front end of the first balancer shaft 11 which is one of the pair of balancer shafts 11, 12, and the endless chain is provided so as to wind around the sprockets 15, 16. Further, there is provided the oil pump 18 at the front side of the cylinder block 4, and a driven sprocket attached to a drive shaft of the oil pump 18 is also wound around by the endless chain 17.

Figure 3:
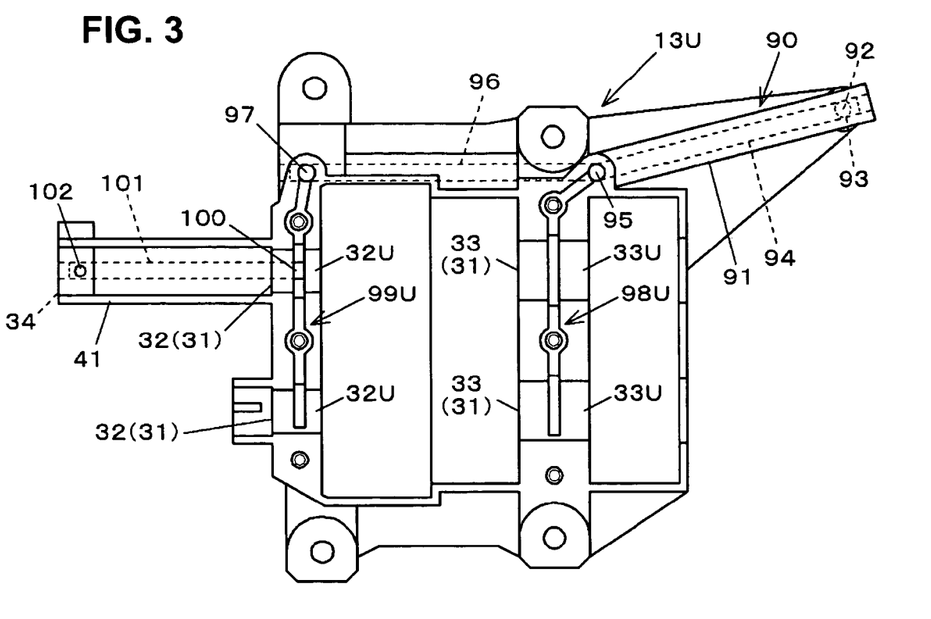
FIG. 3 is a lower face (a facing surface to a lower case) view of an upper case constituting an upper half of the case member, when seen in an arrow B direction of FIG. 2.
Figure 4:
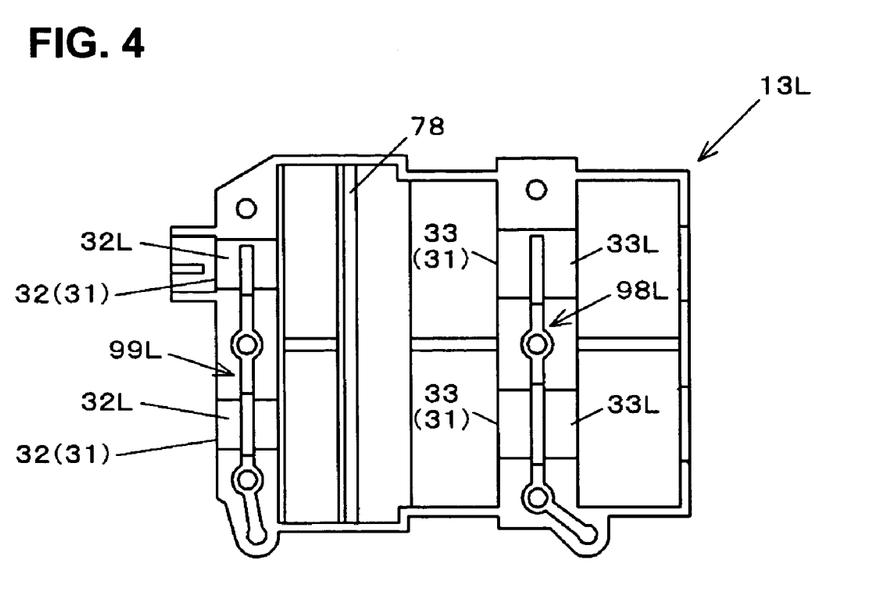
FIG. 4 is an upper face (a facing surface to the upper case) view of a lower case constituting a lower half of the case member, when seen in an arrow C direction of FIG. 2.
Figure 5:
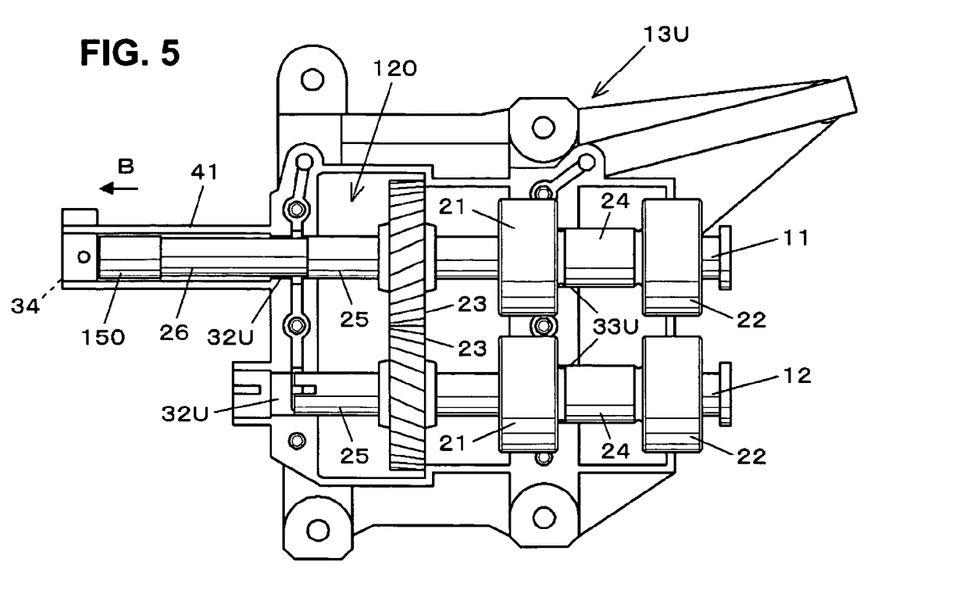
FIG. 5 is a lower face view, which is similar to FIG. 3, showing an initial assembling operation where balancer shafts are installed into the upper case.
Figure 6:
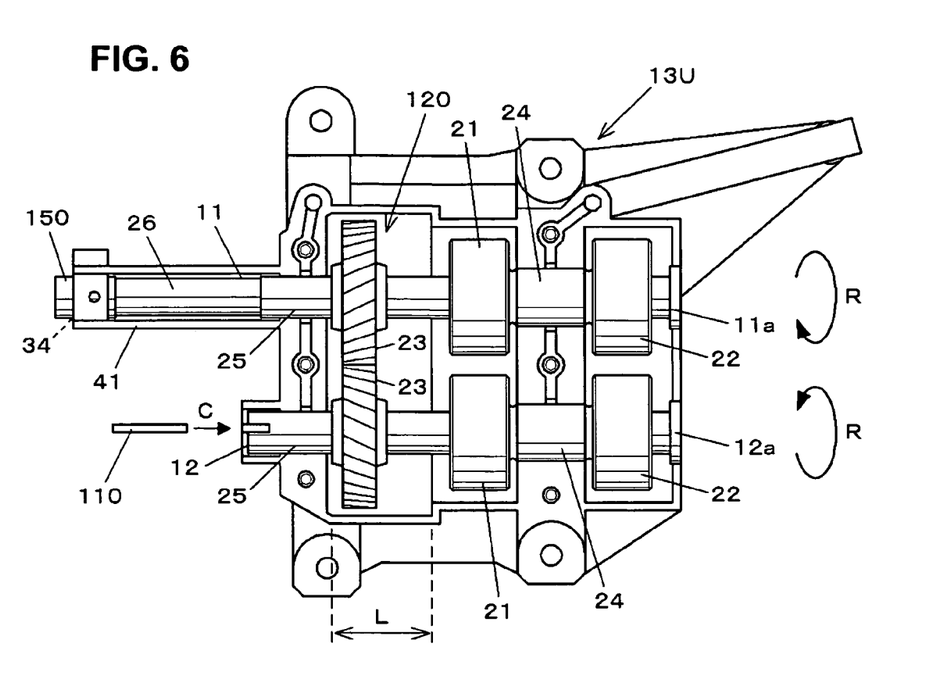
FIG. 6 is a lower face view, which is similar to FIG. 5, showing a closing assembling operation where the balancer shafts are installed into the upper case.
Figure 7:
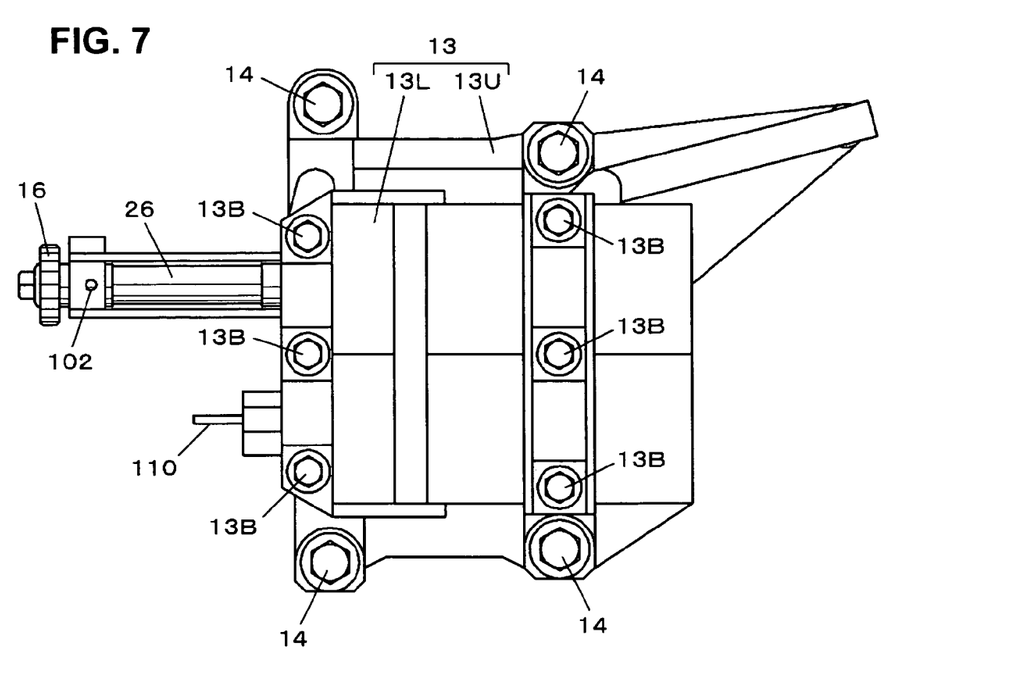
FIG. 7 is a lower face view, which is similar to FIG. 6, of the case member in which the lower case is contacted with and attached to the upper case with the balancer shafts by bolts.
Figure 8:
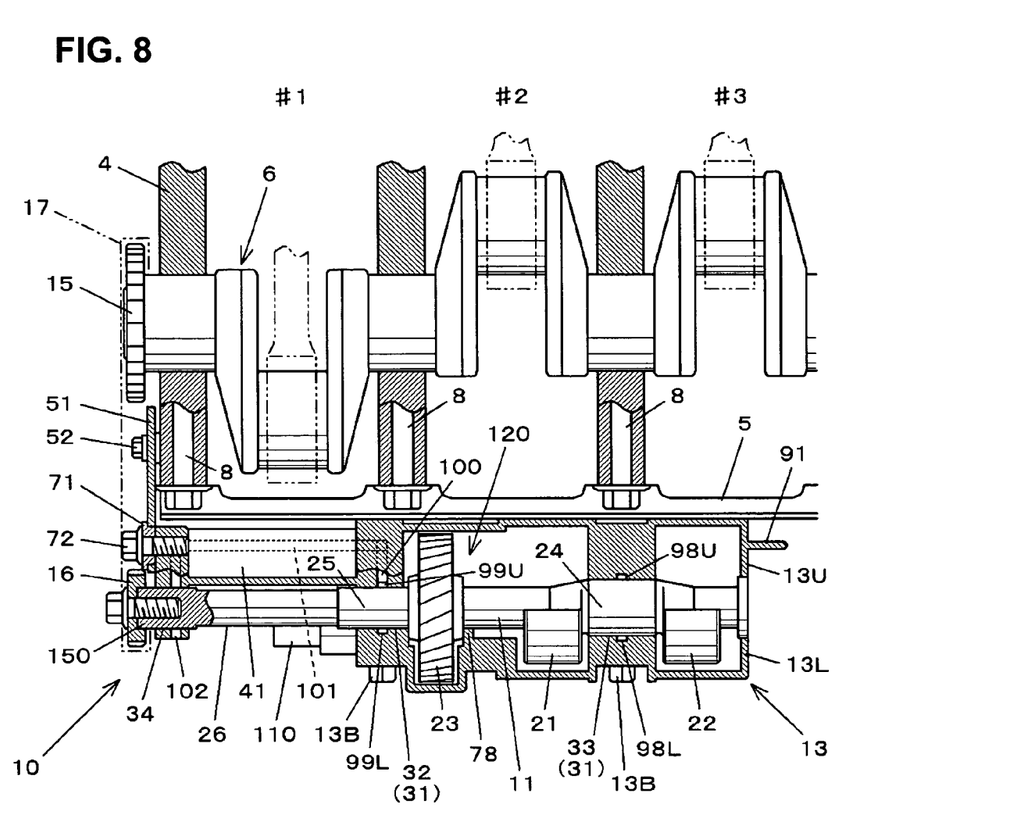
FIG. 8 is a partial-vertical sectional view taken on line A—A of FIG. 2 (with the crankshaft, sprockets, endless chain, supporting bracket and so on).
Figure 9:
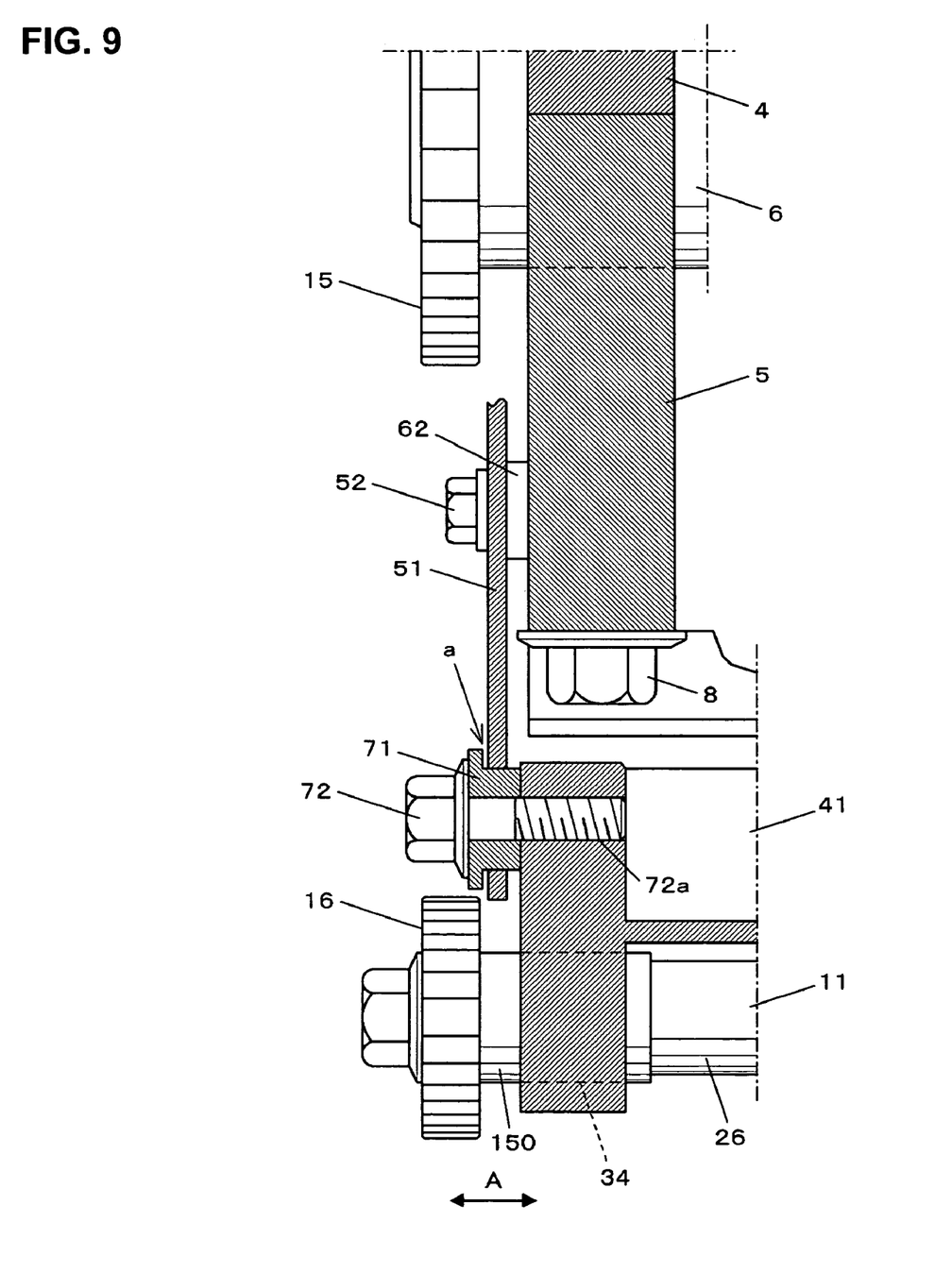
FIG. 9 is an enlarged view of a major part of FIG. 8 showing a state where an end portion of a case extension portion of the case member is supported at the supporting bracket attached to a front side face of a bearing frame.

Next, FIG. 3 is a lower face (a facing surface to the lower case 13) view of the upper case 13U constituting an upper half of the case member 13, FIG. 4 is an upper face (a facing surface to the upper case 13U) view of the lower case 13L constituting a lower half of the case member 13, FIG. 5 is a lower face view, which is similar to FIG. 3, showing an initial assembling operation where the pair of balancer shafts 11, 12 are installed into the upper case 13, FIG. 6 is a lower face view, which is similar to FIG. 5, showing a closing assembling operation where the balancer shafts 11, 12 are installed into the upper case 13U, FIG. 7 is a lower face view, which is similar to FIG. 6, of the case member 13 in which the lower case 13L is contacted with and attached to the upper case 13U with the balancer shafts 11, 12 by bolts 13B . . . 13B, FIG. 8 is a partial-vertical sectional view taken on line A—A of FIG. 2 (with the crankshaft 6, sprockets 15, 16, 19, endless chain 17, supporting bracket 51 and so on), and FIG. 9 is an enlarged view of a major part of FIG. 8 showing a state where an end portion of a case extension portion 41 of the case member 13 is supported at the supporting bracket 51 attached to a front side face of the bearing frame 5.

As shown in FIG. 6, the first and second balancer shafts 11, 12 are disposed respectively in parallel to the crankshaft 6, and include respectively a pair of front-and-back weight portions 21, 22 and rotational gears 23 for transferring rotation which are located at one end side thereof with respect with the front weight portion 21. The balancer shafts 11, 12 rotate at the same speed but in opposite directions R, R to each other, by means of the respective rotational gears 23 engaging with each other. The balancer shafts 11, 12 include respectively rear journal portions 24 which are located between the weight portions 21, 22 thereof, and front journal portions 25 in front of the rotational gears 23 thereof. As shown in FIG. 8, the weight portions 21, 22 are formed respectively so as to protrude radially from the axial center of the balancer shafts 11, 12 in a fan shape with its arc angle less than 180°.

The first balancer shaft 11 includes a shaft extension portion 26 which extends from the front end side thereof beyond the second balancer shaft 12, and the driven sprocket 16 is attached to the shaft extension portion 26 as shown in FIG. 7. More specifically, as shown in FIG. 8, the end portion of the shaft extension portion 26 of the first balancer shaft 11 protrudes forward from the front end face of the engine block 2 (the front end face of the cylinder block 4 and the bearing frame 5 which constitute the engine block 2), and the driven sprocket 16 is attached to the end portion thereof. Also, the end portion of the crankshaft 6 protrudes forward from the front end face of the engine block 2 (the front end face of the cylinder block 4 and the bearing frame 5 which constitute the engine block 2), and the driving sprocket 15 is attached to the end portion thereof.

As shown in FIG. 8, the driven sprocket 16 of the first balancer shaft 11, the driving sprocket 15 of the crankshaft 6, and the driven sprocket 19 of the oil pump 18 are located so as to align with each other in the axial direction of the crankshaft 6 and balancer shafts 11, 12, and the endless chain 17 is provided so as to wind around them properly and certainly. Also, the weight portions 21, 22 of the balancer shafts 11, 12 are located in middle positions in the axial direction of the engine 1 (at portions corresponding to the second and third cylinders in the present embodiment), thereby ensuring reduction of vibration and noise of the engine 1 by the balancer device 10.

As shown in FIG. 8, the case member 13 includes a first bearing portion 31 which supports the balancer shafts 11, 12 at respective portions thereof near the weight portions 21, 22 and the rotational gears 23. The first bearing portion 31 includes a front beating portion 32 which supports the front journal portions 25, 25 and a rear bearing portion 33 which supports the rear journal portions 24, 24.

As shown in FIG. 8, the case member 13 includes, like the first balancer shaft 11, a case extension portion 41 which extends from the front end side thereof, and there is provided at the case extension portion 41 a second bearing portion 34 which supports the first balancer shaft 11 at a portion near the driven sprocket 16 attached to the shaft extension portion 26 (at a shaft extension journal portion 150 (see FIGS. 5 and 9)).

Herein, as shown in FIGS. 2 and 3, the above-described case extension portion 41 and second bearing portion 34 are provided at the upper case 13U.

Also, as shown in FIGS. 3 and 4, the first bearing portion 31 (32, 33) is configured of a hole which is formed by respective half-split (half-circle shaped recess portions) 32U, 33U: 32L, 33L of the upper and lower cases 13U, 13L, while the second bearing portion 34 is, as shown in FIG. 2, configured of a hole which is formed integrally at the case extension portion 41 of the upper case 13U.

As shown in FIG. 8, the case member 13 is configured in a sealed structure so as to enclose the weight portions 21, 22 of the balancer shafts 11, 12. Accordingly, the cavitation caused by babbles inducted from an oil strainer (not illustrated), which are formed through the rotation of the weight portions 21, 22 of the balancer shafts 11, 12 stirring the oil in the oil pan 7 can be prevented.

Also, since rear end portions 11a, 12a of the balancer shafts 11, 12 have their increased diameter so as to seal a rear end face of the case member 13 without any gap as shown in FIG. 6, any unnecessary oil in the oil pan 7 can be prevented from coming into the case member 13 from outside.

As shown in FIG. 1, a supporting bracket 51 is attached to one side face of the engine block 2 (a front end face of the engine block 2). More specifically, as shown in FIG. 8, the supporting bracket 51 is attached to the front end face of the bearing frame 5. As shown in FIG. 1, the supporting bracket 51 is fixed to the bearing frame 5 via three bolts 52, 53, 54. As shown in FIG. 2, three fixed seats 62, 63, 64 to receive the three bolts 52, 53, 54 for fixation are provided at the front end face of the bearing frame 5.

As shown in FIG. 9, there is provided at the supporting bracket 51 a penetrating member (collar member) 71 penetrating the supporting bracket 51 so as to be movable in the axial direction A of the crankshaft 6 and the balancer shafts 11, 12. An end portion of the case extension portion 41 is fixed to the penetrating member 71, whereby the case extension portion 41 is supported at the supporting bracket 51. Namely, as shown in FIGS. 2 and 9, there is provided a screw hole 72a to receive the bolt 72 at the end portion of the case extension portion 41.

As shown in FIG. 1, the supporting bracket 51 includes guide portions 75, 76 for the endless chain 17. Namely, the supporting bracket 51 functions a chain guide as well. The endless chain 17 winds around the driving sprocket 15 of the crankshaft 6, the driven sprocket 16 of the balancer shaft 11, and the driven sprocket 19 of the oil pump 18, and the supporting bracket 51 includes a tensioner 77 to apply a tension force to part of the chain 17 located between the two sprockets 15, 19 and the guide portions 75, 76 to guide respective parts of the chain 17 located between the two sprockets 19, 16 and 16, 15 respectively.

Herein, the supporting bracket 51 is made of a metal plate (thin metal plate) as shown in FIG. 9.

Also, as shown in FIG. 6, the rotational gears 23, 23 are configured of helical gears. Also, as shown in FIGS. 4 and 8, projecting portions (wall portions or thrust limitation portions) 78 operative to sustain a thrust force which acts on the balance shafts 11, 12 due to the rotation of the helical gears 23, 23 are formed at only the lower case 13L at which the case extension portion 41 and the second bearing portion 34 are not provided.

Meanwhile, as shown in FIG. 3, a lubricating oil passage 90 to supply a lubricating oil respectively to the first and second bearing portions 31, 34 provided at the case member 13 is formed in a wall portion constituting the case member 13. Namely, part of the upper case 13U extends backward (a case backward extension portion 91), and an oil introducing port 92 is formed at its end portion so as to open upward. The oil introducing port 92 connects with an oil supply port (not illustrated) which is open on the bottom face of the cylinder block 4 when the upper case 13U is connected to the bottom face of the cylinder block 4. The oil introducing port 92 also connects with a vertical passage 93 formed in the backward extension portion 91.

A lateral passage 94 is formed in the backward extension portion 91, and extends from a lower end portion of the vertical passage 93 to the vicinity of the rear bearing portion 33. A terminal end portion of the lateral passage 94 connects with a vertical passage 95, which extends downward and is open on the facing face of the upper case 13U with the lower case 13L.

There is provided a horizontal passage 96 which extends forwardly and horizontally from a halfway of the vertical passage 95 to the vicinity of the front bearing portion 32. A terminal end portion of the horizontal passage 96 connects with a vertical passage 97, which extends downward and is open on the facing face of the upper case 13U with the lower case 13L.

Also, there are upper recess grooves 98U, 99U which connect with lower opening portions of respective vertical passages 95, 97 and extend on the facing face of the upper and lower cases 13U, 13L and half-split portions 32U, 33U of the first bearing portion 31. Likewise, as shown in FIG. 4, there are lower recess grooves 98L, 99L which extend on the facing face of the upper and lower cases 13U, 13L and half-split portions 32L, 33L of the first bearing portion 31. Herein, the upper and lower recess grooves 98U, 99U: 98L, 99L are formed so as to go around some inserting holes of the case fixing bolts 13B . . . 13B as shown in FIGS. 3 and 4. These upper and lower recess grooves 98U, 99U: 98L, 99L are faced to each other by facing the upper case 13U to the lower case 13L, thereby forming the lubricating oil passage 90 to supply the lubricating oil to the first bearing portion 31 stably and certainly.

Further, as shown in FIGS. 3 and 8, there is provided a middle passage 100 extending upward from a halfway of the half-split portion 32U of the front recess groove 99U at the upper case 13U. An upper end portion of the middle passage 100 connects with a starting end portion of an extension lubricant oil passage 101 which is formed in the case extension portion 41 so as to extend horizontally. The extension lubricant oil passage 101 extends forward and connects with a vertical passage 102 extending vertically from the end portion of the case extension portion 41. The vertical passage 102 is open on an inner face of the hole of the second bearing portion 34 as shown in FIG. 8, thereby forming the lubricating oil passage 90 to supply the lubricating oil to the second bearing portion 34 stably and certainly.

Next, the operation of the balancer device 10 will be described. During the operation of the engine 1, the rotation of the crankshaft 6 is transferred to the first balancer shaft 11 via the chain 17, and then to the second balancer shaft 12 via the rotational gears 23, 23. Thus, the first and second balancer shafts 11, 12 rotate respectively in the opposite directions R, R to each other (see FIG. 6) along with the crankshaft 6. The rotation of the balancer shafts 11, 12 with weight portions 21, 22 generate the vibrating force in the vertical direction, which cancel the vibrating force in the vertical direction caused by the combustion occurring in respective cylinders of the engine 1, so that the vibration and noise of the engine 1 is suppressed. Herein, generally, there exists a problem in secondary vibrating force in such four-cylinder engine as the present embodiment. Accordingly, the balancer shafts 11, 12 are rotated at a speed which is as twice fast as that of the crankshaft 6 in order to cancel the secondary vibrating force.

Next, the assembling operation of the balancer shafts 11, 12 to the case member 13 of the balancer device 10 will be described. First, as shown in FIG. 5, the rotational gears 23, 23 are engaged with each other, adjusting properly rotational phases of respective weight portions 21, 22 of the balancer shafts 11, 12. Next, the pair of balancer shafts 11, 12 are set respectively on the half-split portions 32U, 33U of the first bearing portion 31 at the upper case 13U before facing the upper and lower cases 13U, 13L to each other.

Herein, the end portion of the shaft extension portion 26 of the first balancer shaft 11 is located just behind the hole-shaped second bearing portion 34 of the case extension portion 41 at the upper case 13U. Also, the rotational gears 23, 23 are located at a rearmost portion in a gear non-interference space 120 (see FIG. 8) which is formed at the upper case 13U. Meanwhile, the weight portions 21, 22 protrude at the opposite side to the upper case 13. Accordingly, without being interfered by the weight portions 21, 22, the balancer shafts 11, 12 can be set on the half-split portions 32U, 33U of the first bearing portion 31 at the upper case 13U so as to be kept in its horizontal position.

Then, the pair of balancer shafts 11, 12 are moved forward horizontally like the arrow B of FIG. 5. Thereby, as shown in FIG. 6, the shaft extension journal portion 150 of the first balancer shaft 11 is inserted into the hole of the second bearing portion 34, and is supported at the second bearing portion 34. Also, the front journal portions 25, 25 and the rear journal portions 24, 24 of the balancer shafts 11, 12 are set respectively on the half-split portions 32U, 33U of the first bearing portion 31 at the upper case 13U.

Subsequently, the case member 13 is completed by facing the lower case 13L to the upper case 13U, and the front and rear journal portions 25, 24 of the balancer shafts 11, 12 are supported at the first bearing portion 31 (namely, at the front and rear bearing portions 32, 33).

Herein, as shown in FIG. 6, the rotational gears 23, 23 are located at a foremost portion in the gear non-interference space 120 formed at the upper case 13U (see FIG. 8). Now, respective locations of the weight portions 21, 22, driven sprocket 16, and the end portion of the balancer shaft 11 in the axial direction are determined in advance. Thus, if the front baring portion 32 of the first bearing portion 31 is formed in the hole shape by being integrated with the case member 13, the forward moving distance of the balancer shafts 11, 12 becomes relatively long. Accordingly, the respective locations of the rotational gears 23, 23 and the front bearing portions 32 need to be moved forward in the axial direction, result in the case member 13 extending long forward.

In the present embodiment, however, only the foremost second bearing portion 34 is formed in a hole shape, which is integral with the case member 13, and the other first bearing portion 31 (32, 33) is formed in a half-split shape. Therefore, it can make the horizontal moving distance of the balancer shafts 11, 12 short as much as possible, so that, as shown by L of FIG. 6, the length of the gear non-interference space 120 in the axial direction for preventing the rotational gears 23, 23 from moving horizontally can be reduced, resulting in a compact case member 13.

Herein, as shown by the arrow C in FIG. 6, a positioning plate 110 is attached to the end portion of the second balancer shaft 12 finally. However, the positioning palate 110 is removed when the engine 1 is operated.

Next, the structure for supporting the end portion of the case extension portion 41 of the case member 13 at the side of the engine block 2 in the balancer device 10 will be described. As described above, the screw hole 72a is provided at the end portion of the case extension portion 41 (see FIG. 9). The case extension portion 41 is fixed to the engine block 2 via the screw hole 72a. Namely, as described above, the engine block 2 of the present embodiment includes the cylinder block 4 and the bearing frame 5. Also, the case member 13 of the balancer device 10 is installed at the lower portion of the cylinder block 4. Meanwhile, the supporting bracket 51 for fixing the case extension portion 41 to the engine block 2 is attached and fixed to the three fixed seats at the front end face of the bearing frame 5 via bolts 52, 53, 54. The case extension portion 41 is fixed to the engine block 2 by connecting the end portion of the case extension portion 41 with the supporting bracket 51 via the bolt 72. Namely, the supporting bracket 51 and the case member 13 or the case extension portion 41 are attached via two members of the cylinder block 4 and the bearing frame 5. Accordingly, it may be difficult to align the attaching face of the supporting bracket 51 with the attaching face of the case extension portion 41 precisely.

Herein, the collar member 71 is inserted into the supporting bracket 71 in the present embodiment as shown in FIG. 9. The collar member 71 is movable with respect to the supporting bracket 51 in the axial direction A. The connecting bolt 72 is fastened to the end portion of the case member 13 through the collar member 71. As a result, although the case extension portion 41 and the collar member 71 are integrated with each other, the case extension portion 41 is not connected directly with the supporting bracket 51. Thus, even if there occurs a positional gap between the case extension portion 41 and the supporting bracket 51, the gap may be absorbed by the collar member 71 moving slightly with respective to the supporting bracket 51 in the axial direction A. As shown by a reference characteristic a of FIG. 9, the collar member 71 has a sleeve which is longer than the thickness of the supporting bracket 51 made of the metal plate and enough to absorb the above-described positional gap.

As described above, in the present embodiment, since the first balancer shaft 11 with the driven sprocket 16 attached thereto is supported rotatably at the portion thereof near the driven sprocket 16 at the second bearing portion 34 provided at the case extension portion 41 of the case member 13, the problem that vibration and noise may be caused by the balancer device 10 itself because the shaft extension portion 26 of the first balancer shaft 11 bends and thereby causes vibration of the driven rotator can be avoided properly.

Further, since the second bearing portion 34 is configured of the hole formed integrally at the case extension portion 41, the supporting rigidity of the second bearing portion 34 increases and thus the shaft extension portion 26 of the first balancer shaft 11 is supported more firmly, thereby avoiding the above-described problem certainly. Otherwise, if the second bearing portion 34 is configured of the half-split structure by the upper and lower cases 13U, 13L like the first bearing portion 31 (32, 33), the tension of the endless chain 17 may deteriorate a firm connection of the both cases 13U, 13L and thus the supporting rigidity thereof may decrease, resulting in an uncertain avoidance of the above-described problem.

Meanwhile, since the first bearing portion 31 (32, 33) is configured of the half-split structure (32U, 33U: 32L, 33L) by the upper and lower cases 13U, 13L, the inserting distance (horizontal moving distance) of the balancer shafts 11, 12 into the second bearing portion 34 can be shortened, thereby providing the compact case member 13. Otherwise, if the first bearing portion 31 is configured of the hole formed integrally at the case member 13 like the second bearing portion 34, the inserting distance of the one end (shaft extension journal portion 150) of the first balancer shaft 11 into the second bearing portion 34 may become longer and thus the case member 13 may need a longer length in the axial direction, thereby deteriorating a compactness of the case member 13.

Particularly, since there are provided the large-diameter rotation gears 23, 23 at the portions of the balancer shafts 11, 12 which are located at the one-end sides thereof from the weight portions 21, 22 as apparent from, for example, FIG. 6, such inserting of the balancer shafts 11, 12 need a large enough space (gear non-interference space) 120 at the case member 13 not to prevent the rotational gears 23, 23 from getting through. Accordingly, the longer the balancer shafts 11, 12 are, the bigger above-described gear non-interference space 120, which becomes an useless space after engine assembling, is formed at the lower portion of the cylinder block 2, thereby deteriorating a layout utility.

Next, since the case extension portion 41 and the second bearing portion 34 are provided at the upper case 13U coupled directly to the engine block 2, the supporting rigidity of the second bearing portion 34 can be increased further and the support of the axial extension portion 26 of the first balancer shaft 11 can be made more stable.

Next, since there is provided thrust limitation portions 78 operative to sustain the thrust force which acts on the balance shafts 11, 12 due to the rotation of the helical gears 23, 23 are formed at only lower case 13L at which the case extension portion 41 and the second bearing portion 34 are not provided, a simple structure of the thrust limitation portions 78 can be provided, thereby improving a weight reduction of the case member 13.

Further, in the present embodiment, since the supporting bracket 51 is attached to the front end face of the engine block 2, there is provided at the supporting bracket 51 the collar member 71 penetrating the supporting bracket 51 so as to be movable in the axial direction A of the balancer shafts 11, 12, and the end portion of the case extension portion 41 is fixed to the collar member 71, whereby the case extension portion 41 is supported at the supporting bracket 51, even if there occurs the positional gap between the attaching portion at the side of the supporting bracket 51 and the attaching portion (the end portion) at the side of the case extension portion 41, the positional gap can be absorbed by the collar member 71 operative to be movable in the axial direction A with respect to the supporting bracket 51. Thus, any improper bend and strain may not occur at the supporting bracket 51 and the case extension portion 41, so that the endless chain 17 can be provided so as to wind properly and securely, without any changing of the distance between the axis of the driving sprocket 15 and the axis of the driven sprocket 16 and any inclining of the driven sprocket 16 with respect to the drive sprocket 15.

Namely, while improving the supporting rigidity of the first balancer shaft 11 at the portion near the driven sprocket 16 (near the shaft extension journal portion 150) by the second bearing portion 34 provided at the case extension portion 41, the above-described structure can suppress an attaching displacement gap between the attaching portion at the side face of the engine block 2, i.e., at the side of the supporting bracket 51, and the attaching portion (the end portion) at the side of the case extension portion 41 of the case member 13 which may occur due to an unavoidable positional changing in the axial direction A. As a result, a stable support of the first balancer shaft 11 can be attained.

Next, since the case member 13 and the supporting bracket 51, which are connected with each other, are attached respectively the cylinder block 2 and the bearing fame 5 which are different members and therefore a likelihood of occurrence of the positional gap between the attaching portion at the side of the supporting bracket 51 and the attaching portion (the end portion) at the side of the case extension portion 41 may increase, the absorption of such positional gap by the collar member 71 adaptive to be movable in the axial direction A with respect to the supporting bracket 51 can perform its function and effect more greatly.

Next, since the supporting bracket 51 has both the attaching function of the case extension portion 41 to the engine block 2 and the guiding function for the endless chain 17, reduction in numbers and costs of parts of the balancer device 10 and the attaching work efficiency of the supporting bracket 51 can be improved.

Next, since the supporting bracket 51 is made of the metal plate, a weight reduction of the supporting bracket 51 and the whole of engine 1 can be improved.

Although the above-described embodiment is disclosed as an exemplified preferred embodiment of the present invention, of course, any other modifications can be applied within the scope of the claimed invention.

What is claimed is:

1. A balancer device of an engine, including first and second balancer shafts having respective weight portions thereof, a case member provided at a lower portion of an engine block supporting a crankshaft and supporting the balancer shafts, and a driving member winding around a driving rotator attached to one end of the crankshaft and a driven rotator attached to one end of said first balancer shaft so as to rotate said first balancer shaft by the crankshaft, the improvement comprising:

a pair of rotational gears provided on said first and second balancer shafts so as to engage with each other, the rotational gears being located at said one end side of respective balancer shafts with respect with said weight portions of respective balancer shafts;

a shaft extension portion provided integrally at said one end of the first balancer shaft so as to extend beyond said second balancer shaft, the shaft extension portion having said driven rotator attached thereto;

a first bearing portion provided at said case member to support said balancer shafts at respective portions thereof near said weight portions and said rotational gears;

a second bearing portion provided at said case member to support said first balancer shaft at a portion thereof near said driven rotator;

upper and lower cases configuring said case member, the upper case being coupled to said engine block, the lower case being faced to the upper case;

a case extension portion provided integrally at either said upper case or lower case so as to extend along said shaft extension portion of the first balancer shaft, wherein said first bearing portion is configured of a hole which is formed by respective half-split portions of said upper and lower cases, and said second bearing portion is configured of a hole which is formed integrally at said case extension portion.

2. The balancer device of an engine of claim 1, wherein said case extension portion and said second bearing portion are provided integrally at said upper case.

3. The balancer device of an engine of claim 1, wherein said rotational gears are configured of helical gears, and a projecting portion operative to sustain a thrust force which acts on said balance shafts due to a rotation of said helical gears is formed at only either said upper case or said lower case at which said case extension portion and said second bearing portion are not provided.

4. The balancer device of an engine of claim 1, wherein said case member is configured in a sealed structure so as to enclose said weight portions of the balancer shafts, and a lubricating oil passage to supply a lubricating oil respectively to said first and second bearing portions provided at said case member is formed in a wall portion constituting said case member.

5. The balancer device of an engine of claim 1, wherein a supporting bracket is attached to a side face of said engine block which is located at a side of said one end of the crankshaft, there is provided at said supporting bracket a penetrating member penetrating the supporting bracket so as to be movable in an axial direction of the balancer shaft, and an end portion of said case extension portion is fixed to said penetrating member, whereby said case extension portion is supported at said supporting bracket.

6. The balancer device of an engine of claim 5, wherein said engine block includes a cylinder block supporting an upper half of said crankshaft and a bearing cap attached to a lower portion of said cylinder block to support a lower half of said crankshaft, said case member is attached to a lower portion of said cylinder block, and said supporting bracket is attached to a side face of said bearing cap.

7. The balancer device of an engine of claim 5, wherein said supporting bracket includes a guide portion for said driving member winding around the driving and driven rotators.

8. The balancer device of an engine of claim 5, wherein said supporting bracket is made of a metal plate.

9. A balancer device of an engine, including first and second balancer shafts having respective weight portions thereof, a case member provided at a lower portion of an engine block supporting a crankshaft and supporting the balancer shafts, and a driving member winding around a driving rotator attached to one end of the crankshaft and a driven rotator attached to one end of said first balancer shaft so as to rotate said first balancer shaft by the crankshaft, the improvement comprising:

a pair of rotational gears provided on said first and second balancer shafts so as to engage with each other, the rotational gears being located at said one end side of respective balancer shafts with respect with said weight portions of respective balancer shafts;

a shaft extension portion provided integrally at said one end of the first balancer shaft so as to extend beyond said second balancer shaft, the shaft extension portion having said driven rotator attached thereto;

a first bearing portion provided at said case member to support said balancer shafts at respective portions thereof near said weight portions and said rotational gears;

a second bearing portion provided at said case member to support said first balancer shaft at a portion thereof near said driven rotator;

upper and lower cases configuring said case member, the upper case being coupled to said engine block, the lower case being faced to the upper case;

a case extension portion provided integrally at either said upper case or lower case so as to extend along said shaft extension portion of the first balancer shaft, wherein said first bearing portion is configured of a hole which is formed by respective half-split portions of said upper and lower cases, said second bearing portion is configured of a hole which is formed integrally at said case extension portion, said case extension portion and said second bearing portion are provided integrally at said upper case, said rotational gears are configured of helical gears, and a projecting portion operative to sustain a thrust force which acts on said balance shafts due to a rotation of said helical gears is formed at only either said upper case or said lower case at which said case extension portion and said second bearing portion are not provided.

10. A balancer device of an engine, including first and second balancer shafts having respective weight portions thereof, a case member provided at a lower portion of an engine block supporting a crankshaft and supporting the balancer shafts, and a driving member winding around a driving rotator attached to one end of the crankshaft and a driven rotator attached to one end of said first balancer shaft so as to rotate said first balancer shaft by the crankshaft, the improvement comprising:

- a pair of rotational gears provided on said first and second balancer shafts so as to engage with each other, the rotational gears being located at said one end side of respective balancer shafts with respect with said weight portions of respective balancer shafts;
- a shaft extension portion provided integrally at said one end of the first balancer shaft so as to extend beyond said second balancer shaft, the shaft extension portion having said driven rotator attached thereto;
- a first bearing portion provided at said case member to support said balancer shafts at respective portions thereof near said weight portions and said rotational gears;
- a second bearing portion provided at said case member to support said first balancer shaft at a portion thereof near said driven rotator;
- upper and lower cases configuring said case member, the upper case being coupled to said engine block, the lower case being faced to the upper case;
- a case extension portion provided integrally at either said upper case or lower case so as to extend along said shaft extension portion of the first balancer shaft, wherein said first bearing portion is configured of a hole which is formed by respective half-split portions of said upper and lower cases, said second bearing portion is configured of a hole which is formed integrally at said case extension portion, a supporting bracket is attached to a side face of said engine block which is located at a side of said one end of the crankshaft, there is provided at said supporting bracket a penetrating member penetrating the supporting bracket so as to be movable in an axial direction of the balancer shaft, an end portion of said case extension portion is fixed to said penetrating member, whereby said case extension portion is supported at said supporting bracket, said engine block includes a cylinder block supporting an upper half of said crankshaft and a bearing cap attached to a lower portion of said cylinder block to support a lower half of said crankshaft, said case member is attached to a lower portion of said cylinder block, and said supporting bracket is made of a metal plate and attached to a side face of said bearing cap.

* * * * *